United States Patent
Waltz (10) Patent No.: US 9,718,447 B2
(45) Date of Patent: Aug. 1, 2017

(54) THERMAL MANAGEMENT COMPOSITE HEAT SHIELD

(75) Inventor: James C. Waltz, Brookville, OH (US)

(73) Assignee: Goodrich Corporation, Charlotte, NC (US)

( * ) Notice: Subject to any disclaimer, the term of this patent is extended or adjusted under 35 U.S.C. 154(b) by 1188 days.

(21) Appl. No.: 12/692,181

(22) Filed: Jan. 22, 2010

(65) Prior Publication Data

US 2010/0194179 A1 Aug. 5, 2010

Related U.S. Application Data (60) Provisional application No. 61/149,178, filed on Feb. 2, 2009.

(51) Int. Cl.
*B60B 19/10* (2006.01)
*B60B 19/00* (2006.01)
(Continued)

(52) U.S. Cl.
CPC ............... *B60T 5/00* (2013.01); *B32B 5/024* (2013.01); *B32B 5/26* (2013.01); *B32B 2307/30* (2013.01);
(Continued)

(58) Field of Classification Search
CPC ........ F16D 65/78; F16D 65/847; F16D 65/84; F16D 65/128; F16D 65/785;
(Continued)

(56) References Cited

U.S. PATENT DOCUMENTS 3,003,598 A * 10/1961 Sumner et al. ............ 188/218 R
3,035,667 A * 5/1962 Malthaner ............... F16D 65/10
188/18 R
(Continued)

FOREIGN PATENT DOCUMENTS

CN 201293297 9/2008
EP 0555822 8/1993
(Continued)

OTHER PUBLICATIONS

Examination Report dated Oct. 15, 2012 in GB Application No. GB1001629.3.
(Continued)

*Primary Examiner* — Ryan J Walters
*Assistant Examiner* — Jason Thompson
(74) *Attorney, Agent, or Firm* — Snell & Wilmer L.L.P.

(57) ABSTRACT

A thermal management system and methods for use are disclosed. The thermal management system comprises a shield portion and a dissipation portion. The shield portion may comprise a hot side skin, a conduction layer, an insulation layer, and a cool side skin. The dissipation portion may comprise a fin array. Heat absorbed by the shield portion is partially or fully conducted to the dissipation portion for transfer to the ambient environment. The thermal management system may be employed as an aircraft wheel heat shield, an automotive brake heat shield, a gas turbine heat shield, an electronic heat sink, and in various other applications where heat shielding and/or heat transfer are desirable.

4 Claims, 6 Drawing Sheets (51) Int. Cl.

| | | |
|---|---|---|
| *F28F 13/00* | (2006.01) | |
| *B60H 1/00* | (2006.01) | |
| *B64C 25/42* | (2006.01) | |
| *B60T 5/00* | (2006.01) | |
| *B32B 5/26* | (2006.01) | |
| *B32B 5/02* | (2006.01) | |
| *F16D 65/78* | (2006.01) | |

(52) U.S. Cl.
CPC ..... *B32B 2307/306* (2013.01); *B32B 2605/18* (2013.01); *B64C 25/42* (2013.01); *F16D 2065/785* (2013.01); *Y10T 29/49826* (2015.01)

(58) Field of Classification Search
CPC .... F16D 65/789; F16D 69/006; F16D 69/005; F16D 2069/005; F16D 2069/006; F16D 2065/789; F16D 2065/785; B60T 5/00; B64C 25/42; B32B 2605/18; F28D 2021/0084; F28D 2021/008
USPC .............. 165/135, 41, 80.3; 301/6.1, 6.91; 244/100 R, 103 R, 111
See application file for complete search history.

(56) References Cited

U.S. PATENT DOCUMENTS

| | | | | |
|---|---|---|---|---|
| 3,053,350 | A * | 9/1962 | Lowey | 188/218 R |
| 3,457,988 | A * | 7/1969 | Stewart | H01L 23/3672 165/185 |
| 3,889,786 | A * | 6/1975 | Schrader | F16D 65/10 188/218 R |
| 4,130,187 | A * | 12/1978 | Midolo | 188/264 CC |
| 5,002,342 | A * | 3/1991 | Dyko | 301/6.91 |
| 5,111,577 | A | 5/1992 | Sheridan et al. | |
| 5,538,114 | A * | 7/1996 | White et al. | 188/218 R |
| 6,003,954 | A * | 12/1999 | Everhard et al. | 301/6.1 |
| 6,712,128 | B1 * | 3/2004 | Dussinger | H01L 23/4093 165/182 |
| 6,834,159 | B1 | 12/2004 | Schramm | |
| 6,915,880 | B2 * | 7/2005 | Swales | 188/18 A |
| 7,255,208 | B2 * | 8/2007 | Rea | 188/264 G |
| 7,333,336 | B2 * | 2/2008 | Kim | H01L 23/427 165/104.33 |
| 2002/0158332 | A1 * | 10/2002 | Masayuki | 257/712 |
| 2003/0047394 | A1 * | 3/2003 | Hayes et al. | 188/264 AA |
| 2003/0053818 | A1 | 3/2003 | Kimura | |
| 2003/0116312 | A1 * | 6/2003 | Krassowski et al. | 165/185 |
| 2003/0205368 | A1 * | 11/2003 | Chiu | 165/185 |
| 2008/0115910 | A1 * | 5/2008 | Sheng | 165/80.3 |
| 2008/0121475 | A1 | 5/2008 | Bhaskara | |
| 2009/0046464 | A1 * | 2/2009 | Liu et al. | 362/294 |

FOREIGN PATENT DOCUMENTS

| | | |
|---|---|---|
| FR | 2911244 | 7/2008 |
| GB | 1402535 | 8/1975 |
| GB | 2074265 | 10/1981 |
| GB | 2345103 | 6/2000 |
| JP | 06123320 | 10/1992 |
| JP | 07226466 | 2/1994 |
| JP | 07324507 | 6/1994 |
| JP | 2005252175 | 3/2004 |
| JP | 2005252175 | 9/2005 |

OTHER PUBLICATIONS

GB: Search Report relating to Claim 11 dated Nov. 25, 2010 in Application No. GB1001629.3.
GB: Search Report relating to Claim 16 dated Nov. 25, 2010 in Application No. GB1001629.3.
Patents Act 1977: Search Report under Section 17(5) dated May 21, 2010 for Application No. GB100629.3.
Search Report and Written Opinion dated Nov. 26, 2013 in French Application No. 1050700.

* cited by examiner

THERMAL MANAGEMENT COMPOSITE HEAT SHIELD

CROSS REFERENCE TO RELATED APPLICATIONS

This application claims priority to and the benefit of U.S. Provisional Application Ser. No. 61/149,178, filed on Feb. 2, 2009, entitled "THERMAL MANAGEMENT COMPOSITE HEAT SHIELD," which is incorporated by reference herein.

FIELD OF INVENTION

The present invention generally relates to thermal management, and more particularly, to thermal transmission and thermal shielding in brake systems.

BACKGROUND OF THE INVENTION

Various mechanical and/or electrical systems, such as braking systems (and in particular, aircraft braking systems), typically generate significant heat. For example, significant heat is generated when the kinetic energy of a vehicle is converted to thermal energy. To help compensate for the increased temperatures, individual brake components (e.g., brake pads, rotors, and the like) may be configured to tolerate high temperatures.

For example, an aircraft brake pad friction component may absorb a significant amount of heat during braking (e.g., resulting in a brake pad friction component temperature exceeding 1000 degrees Fahrenheit), while other components in the vicinity of the brakes, such as an aluminum wheel, may be less heat tolerant. Accordingly, brake pad friction components gradually dissipate heat while the aircraft is parked on the ground. The ability to expeditiously cool the brake pad friction components may influence how quickly the aircraft is allowed to "turn around" and complete another takeoff/landing cycle. In this regard, cooling a brake pad friction component or other structural components more rapidly may enable higher utilization of an aircraft or other vehicle.

Typical conventional attempts to address such heat concerns and decrease cooling time involve bringing a cooling medium (e.g., air driven by electric fans) to the source of heat in order to transfer the heat away. However, bringing the cooling medium to the heat source is often not practical and/or may be expensive.

Accordingly, improved thermal management techniques and components may reduce and/or eliminate the need for bulky, heavy, and/or complicated additional safety and/or cooling systems. Moreover, a need exists to prevent heat generated by a braking system from reaching other heat-sensitive components.

SUMMARY OF THE INVENTION

A thermal management system and methods for use are provided herein. In various embodiments, the thermal management system comprises a shield portion and a dissipation portion. Heat absorbed by the shield portion may be conducted to the dissipation portion for transfer to the ambient environment. The thermal management system may be employed in an aircraft wheel heat shield, an automotive brake heat shield, a gas turbine heat shield, an electronic heat sink, and in various other applications where heat shielding and/or heat transfer are desirable.

In various embodiments, the shield portion comprises a hot side skin, a conduction layer, an insulation layer, and a cool side skin, while the dissipation portion may comprise a fin array and an optional main body (which may itself by incorporated into the fin array). The conduction layer may comprise a planar carbon fiber structure or graphite flake configured with an in-plane thermal conductivity from about 100 watts per meter-Kelvin to greater than about 2000 watts per meter-Kelvin. The insulation layer may comprise a planar nanoporous structure configured with a through-plane thermal conductivity of less than about 25 watts per meter-Kelvin. An aircraft wheel heat shield, comprising a cylindrical first structure positioned to receive, in a radial direction, heat generated by a heat source comprising an aircraft brake, the cylindrical first structure disposed coaxial to an aircraft wheel, wherein the first structure is in the form of a cylinder; and a cylindrical second structure disposed coaxially to the first structure and at least partially radially overlapping the cylindrical first structure, thermally coupled to the cylindrical first structure, for conducting the heat in an axial direction to a third structure, wherein the cylindrical second structure is in the form of a cylinder, wherein the third structure comprises a heat dissipation apparatus, wherein the cylindrical second structure comprises a carbon fiber structure configured with a thermal conductivity in the axial direction greater than about 100 watts per meter-Kelvin, where the heat dissipation apparatus comprises an array of fins, the array of fins configured such that longitudinal fins overlap each other on an inner radial side and such that a plurality of radially aligned airflow openings are formed on an outer radial side of each fin in the array of fins, wherein radially aligned airflow openings are prevented from being formed on the inner radial side of each fin.

In various embodiments, a thermal management system may be manufactured by impregnating a sheet of carbon fiber with a resin to form a first layer, infiltrating a carbon felt with nanoporous material to form a second layer, and coupling the first layer and second layer to form an assembly. The method may further comprise pyrolyzing the assembly at a temperature between about 900 degrees Celsius and 1350 degrees Celsius, and then annealing the assembly at a temperature between about 1800 degrees Celsius and 3000 degrees Celsius. The assembly may then be coated with a coating material configured to reduce porosity of the assembly.

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, a thermal management system is any device and/or structure configured to reduce, restrict and/or eliminate the flow of heat to a desired area. Moreover, a thermal management system may also increase the flow of heat to another desired area. For example, through the use of a thermal management system, all or a portion of the heat generated by a brake assembly located within an aircraft wheel or tire may be prevented from reaching the wheel, and all or a portion of the heat may be transferred to an area exposed to an ambient airstream in order to achieve faster cooling of various brake assembly components.

Figure 1:
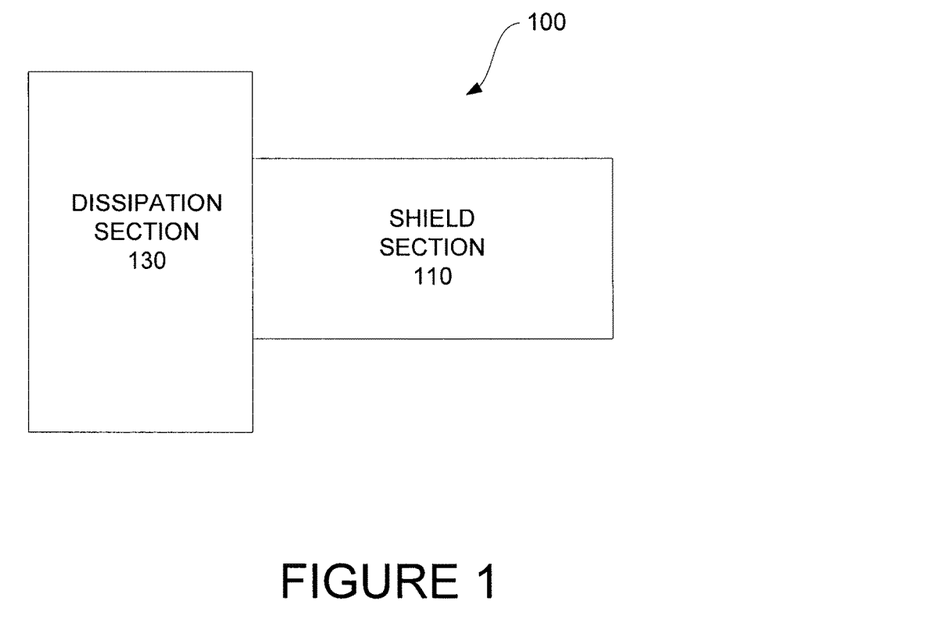
FIG. 1 illustrates a thermal management system in accordance with an embodiment.

With reference now to FIG. 1, and in accordance with various exemplary embodiments, a thermal management system 100 comprises shield section 110 and dissipation section 130. As described in further detail below, shield section 110 further comprises hot side skin 102, conduction layer 104, insulation layer 106, and cool side skin 108. Dissipation section 130 further comprises main body 132 and fin array 134. Shield section 110 and dissipation section 130 are operatively coupled to allow heat transfer between them.

Figure 2:
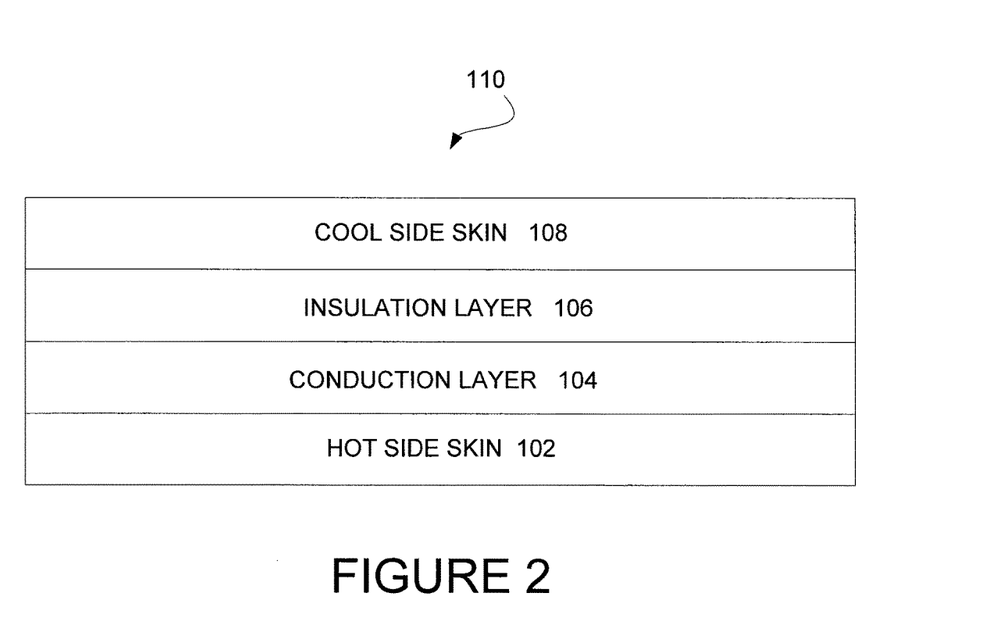
FIG. 2 illustrates a shield section of a thermal management system in accordance with an embodiment.

With reference now to FIG. 2, shield section 110 comprises any suitable structure configured to provide a low degree of thermal conductivity in a first direction and a high degree of thermal conductivity in a second direction. Moreover, shield section 110 may comprise a mechanically solid and strong structure. In an exemplary embodiment, shield section 110 is a brake heat shield comprised of hot side skin 102, conduction layer 104, insulation layer 106, and cool side skin 108. Moreover, shield section 110 may comprise any suitable number, type, size, and configuration of layers and/or materials to fully or partially provide a desired thermal conductivity differential and/or mechanical characteristics. For example, conduction layer 104 may be thicker than, the same thickness as, or thinner than insulation layer 106 in order to provide desired thermal conductivity characteristics for shield section 110.

With continued reference to FIG. 2, and in accordance with an exemplary embodiment, hot side skin 102 comprises any suitable structure configured to provide a high strength structural layer to shield section 110. Hot side skin 102 is coupled to conduction layer 104, and fully or partially transmits heat received from an external source to conduction layer 104. In various embodiments, hot side skin 102 may comprise a metal, a composite, a ceramic, and/or the like. In an exemplary embodiment, hot side skin 102 comprises silicon carbide reinforced with a high conductivity carbon fiber. The carbon fiber may have any appropriate characteristics, for example, any suitable diameter, spacing, density, alignment, length, and the like. Moreover, the silicon carbide offers superior oxidation resistance when compared with a typical carbon matrix. Further, a final processing step utilizing polysilizane resin infiltration may be employed in order to create a strong, dense outer surface layer.

Hot side skin 102 may further comprise a woven mat. The woven mat may be any weave configuration selected to give a desired characteristic, such as thickness, surface structure, and the like. For example, the reinforcing carbon fiber may comprise a woven sheet of low-modulus pitch-based carbon fibers, for example Amoco P55, P30X, or K-1100, Nippon XNC 25, XN50A, XN70A, or XN80A, Thornel® K-800x, or Cytek C-100. Moreover, any suitable reinforcing material may be used.

In various embodiments, hot side skin 102 exhibits a tensile strength of from about 200 MPa to about 400 MPa at room temperature. Hot side skin 102 also exhibits a flexural strength of from about 150 MPa to about 350 MPa at room temperature. In an exemplary embodiment, hot side skin 102 exhibits a tensile strength of about 300 MPa at room temperature and a flexural strength of about 250 MPa at room temperature.

Hot side skin 102 may further comprise a solid surface or any other material configured to be resistant to penetration by foreign materials. For example, hot side skin 102 may comprise CMC (ceramic matrix composite forming) polymer.

In various embodiments, hot side skin 102 comprises a carbon matrix reinforced with carbon fiber textile or a CMC comprising polysialate matrix reinforced with carbon fiber textile. In embodiments having a CMC hot side skin, the CMC may comprise an aluminosilicate CMC based on polysilate resin or a silicon carbide ("SiC") CMC based on polysilazane resin. In embodiments having a carbon composite hot side skin, the carbon composite may be based upon pitch resin.

In embodiments having an aluminosilicate CMC based on polysilate resin, the polysilate matrix may be formed at pressures of from about 8 MPa to about 12 MPa, more preferably from about 9 MPa to about 11 MPa, and most preferably at about 10 MPa. An aluminosilicate CMC based on polysilate resin may be cured at temperatures less than about 150° C. and above about 0° C.

In embodiments having a SiC CMC based on polysilazane resin, any method of infiltrating or densifying may be employed to produce the final CMC. For example, vacuum resin transfer or slurry casting may be used to densify polysilazane resin with SiC. Polysilizane undergoes pyrolysis between about 750° C. to about 1400° C.

With continued reference to FIG. 2, and in accordance with an exemplary embodiment, conduction layer 104 comprises any structure configured with comparatively high in-plane thermal conductivity and comparatively low through-plane (i.e., substantially normal to plane) thermal conductivity. For example, conduction layer 104 may comprise a fiber, a foam, a flake, a nanoparticle, and/or other structure configured to achieve desired thermal conductivity characteristics. In an exemplary embodiment, conduction layer 104 is coupled to hot side skin 102 and to insulation layer 106. By coupling conduction layer 104 to hot side skin 102, heat may be transferred to conduction layer 104 from hot side skin 102 such that the heat is conducted along the high thermally conductive plane of conduction layer 104. Conduction layer 104 may also extend at least partially into dissipation section 130. Moreover, conduction layer 104 may be configured to reduce hot spots resulting from uneven application of thermal energy to conduction layer 104, for example by spreading heat via in-plane thermal conduction.

In an exemplary embodiment, conduction layer 104 comprises a generally planar graphite fiber reinforced composite material. Pitch-based carbon fibers may be utilized to provide a high strength and lightweight configuration. Various parameters (e.g., the cross-section of the reinforcing fibers, the reinforcing orientation, and the like) may be suitably varied to achieve a desired level of in-plane thermal conductivity and/or a desired level of through-plane thermal conductivity.

Conduction layer 104 may comprise a three-dimensional woven composite comprised of silicon carbide and graphite fiber. Conduction layer 104 may comprise a structure having an intermediate grade in all directions (e.g., Amoco P55 or similar). Conduction layer 104 may also comprise a structure having a high thermal conductivity in the high fiber density direction (e.g., Amoco K-100 or similar). The woven mat may be any weave configuration selected to achieve a desired thickness, surface characteristic, and the like. For example, a woven sheet of low-modulus, pitch-based carbon fibers (e.g., Amoco P30X, Nippon XNC25, and the like) may be impregnated with a selected resin, such as by a pressure rolling process wherein the sheet is squeezed between opposing rollers. Resin may be applied to the sheet before rolling and/or during rolling. The post-rolling sheet may be handled, formed, molded, and otherwise shaped and/or configured after exiting the rolling process. The quantity of resin applied to the sheet may be varied to achieve a desired state after pyrolysis (i.e., after heating the material in the absence of oxygen).

During pyrolysis, much of the resin is burned off, and much of the remaining resin is converted to carbon. In an exemplary embodiment, the quantity of resin residue is approximately 20% of the original resin. In another exemplary embodiment, the quantity of resin residue is from about 3% to about 11% of the combined volume of composite fiber and resin structure. Carbon residue remaining after pyrolysis of the resin typically does not offer the high conductivity properties of the carbon fibers. As such, this residue may be minimized to an amount sufficient to provide a desired level of thermal conductivity, yet maintain a desired level of structural stability of conduction layer 104.

Conduction layer 104 may also comprise thermal pyrolytic graphite (TPG), such as TPG manufactured from thermal decomposition of hydrocarbon gas in a high temperature chemical vapor deposition reactor. In this configuration, conduction layer 104 may comprise highly oriented crystals in an in-plane structure. Moreover, conduction layer 104 may exhibit an in-plane thermal conductivity from about 1300 w/mK to about 1700 w/mK, and may exhibit a through-plane thermal conductivity from about 5 w/mK to about 25 w/mK.

In various exemplary embodiments, conduction layer 104 may be partially or fully foam reinforced. In an exemplary embodiment, conduction layer 104 comprises high conductivity pitch-derived graphite foam. Conduction layer 104 may thus exhibit in-plane thermal conductivity in excess of 170 w/mK, while having a density of about 0.6 grams per cubic centimeter.

Conduction layer 104 may also comprise a high conductivity filler. In an exemplary embodiment, conduction layer 104 comprises a carbon nanofiber filler having a fiber diameter from about 70 nanometers to about 200 nanometers, and a fiber length from about 50 microns to about 100 microns (e.g., Pyrograf®-III or similar). In another exemplary embodiment, conduction layer 104 comprises a discontinuous fiber (e.g., ThermalGraph® DKA X or similar). Conduction layer 104 may also comprise a fibrous or foam material impregnated with carbon nanotubes. Conduction layer 104 may incorporate various forms of nanotubes, such as spun threads, felted mats, and the like.

In various exemplary embodiments, conduction layer 104 comprises a series of layered materials. For example, conduction layer 104 may comprise a first sub-layer having a high thermal conductivity in a first direction X co-planar to conduction layer 104, and a second sub-layer having a high thermal conductivity in a second direction Y, where Y is also co-planar to conduction layer 104 but normal to first direction X. In this manner, conduction layer 104 may achieve desirable thermal conductivity properties while also achieving other desired characteristics, for example thickness, weight, strength, and the like.

In various embodiments, a conductive layer may comprise molded graphite flakes or particles with mesophase pitch resin. Mesophase carbon pitch (liquid crystal pitch) is typically partially pyrolyzed such that the conversion to graphite is only partial. Continued pyrolysis results in graphitization of the mesophase pitch and may be used as a matrix material to bind carbon flakes or fibers. The use of molded graphite flakes or particles with mesophase pitch resin may result in a final part comprising a highly oriented carbon graphite composite material. Such a final part may be formed by a mixing a mesophase pitch with graphite flakes, rolling and/or pressing the mixture to align the graphite flakes to form a part body, carbonizing the part body and graphitizing the part body. Carbonizing may be performed between about 1000° C. to about 1500° C. Graphitizing may be performed between about 2000° C. and about 2800° C. The crystal structure of the resultant graphite may form a thermally anisotropic carbon material, with thermal (and electrical) conductivity within the plane that may be much higher than thermal (and electrical) conductivity through the plane. The thermal conductivity of such a thermally anisotropic carbon material may be suitable for use as a conductive layer, as disclosed herein.

Flake graphite is a naturally occurring form of graphite that is typically found as discrete flakes ranging in size from about 50 micrometers to about 800 micrometers in diameter and from about 1 micrometer to about 150 micrometers thick. Such a form of graphite has a high degree of crystallinity, high thermal and electric conductivity, and suitable molding characteristics for use as a conductive layer. Purified flake graphite carbon is available in purities ranging from 99.7-99.9% (LOI), and sizes from about 2 microns to about 800 microns. Thermal treatment of the raw graphite materials at temperatures up to about 2800° C. is preferred so that at least a portion of the volatile compounds, gases and impurities are vaporized.

The formation of molded graphite flakes or particles with mesophase pitch resin may occur using any suitable method now known or hereinafter developed. It is believed that graphite flake size may affect thermal conductivity of the final part body. For example, it is believed that larger graphite particles provide a higher thermal conductivity of the final part body. As described above, graphite flake size may range from about 2 microns to about 800 microns, although it is preferred that graphite flake size is less than about 200 microns. Further, it is believed that thermal conductivity increases as a function of final part density, graphite purity, and degree of graphitization. Thus, particle size, final density, purity, and graphitization may be adjusted to achieve various thermal conductivity properties of a conductive layer.

A conductive layer comprising molded graphite flakes or particles with mesophase pitch resin may be formed in a configuration having a high aspect ratio. For example, an aspect ratio of about 10:100 or higher may be appropriate for use in various embodiments.

Conduction layer 104 may also comprise molded exfoliated graphite particulate with a polysialate binder, a polysilazane binder, and/or a pitch carbon binder. In an exemplary embodiment, molded exfoliated graphite particulate using a polysialate binder is used in embodiments having a hot side skin comprising an aluminosilicate CMC. In an exemplary embodiment, molded exfoliated graphite particulate using a polysilazane binder is used in embodiments having a hot side skin comprising a SiC CMC. In an exemplary embodiment, molded exfoliated graphite particulate using a pitch carbon binder is used in embodiments having a hot side skin comprising a carbon composite. However, any combination of hot side skin and conduction layer is contemplated herein.

With continued reference to FIG. 2, and in accordance with an exemplary embodiment, insulation layer 106 comprises any structure configured with comparatively low thermal conductivity, particularly in the through-structure direction. For example, insulation layer 106 may comprise a fiber, a foam, and/or other structure configured to achieve desired thermal conductivity characteristics. Insulation layer 106 may be coupled to conduction layer 104 and to cool side skin 108.

In various exemplary embodiments, insulation layer 106 partially or fully comprises an aerogel, for example a low-density, open-cell foam having a fine cell size. Aerogels typically exhibit continuous porosity and a microstructure comprised of interconnected colloidal-like particles or polymeric chains with characteristic diameters from about 30 nanometers to about 5 micrometers. The microstructure imparts high surface area to aerogels, for example, from about 350 square meters per gram to about 1000 square meters per gram.

In various embodiments, aerogels may be used in conjunction with carbon foam or felt. For example, a carbon felt or foam/aerogel insulation layer may be used in conjunction with a conductive layer comprising a molded exfoliated graphite particulate using a polysilazane binder and a hot side skin comprising a SiC CMC. Also in various embodiments, a carbon felt or foam/aerogel insulation layer may be used in conjunction with a conductive layer comprising a molded exfoliated graphite particulate using a pitch carbon binder and a hot side skin comprising a carbon composite.

In an embodiment, a nanoporous carbon aerogel may be synthesized with a solution of resorcinol, formaldehyde, catalyst, and water. Gelation of the solution and aging provide the nanostructured network. The solvent (water) in the pores is replaced by acetone and the gel is subcritically dried. The resulting resorcinol-formaldehyde aerogel may be converted into a pure carbon aerogel by pyrolysis. The pore sizes within the carbon aerogel may be tailored, for example, from about 30 nanometers to about 5 micrometers, by suitable modification of the processing parameters. The nanoporous structure of the aerogel reduces gaseous thermal conduction as well as thermal transport.

In various embodiments, insulation layer 106 comprises a series of layered materials. For example, insulation layer 106 may comprise a first sub-layer having a desired convective thermal conductivity, and a second sub-layer having a desired radiative thermal conductivity. In this manner, a desired net thermal conductivity of insulation layer 106 may be obtained.

In an exemplary embodiment, insulation layer 106 comprises a generally planar fiber structure configured as a structural reinforcement for an aerogel insulator. In this configuration, an impregnated aerogel insulator occupies small pores between the carbon fibers, reducing convective and/or radiative heat transfer. A desirable level of insulation is thus achieved, as the transfer of heat by radiation through the pores dominates at high temperatures, and the aerogel insulator reduces this transfer. In an embodiment, insulation layer 106 has a density of about 0.07 grams per cubic centimeter. Moreover, insulation layer 106 may also be configured to withstand an applied temperature in excess of 4000 degrees Fahrenheit (2204 degrees Celsius).

In another embodiment, insulation layer 106 comprises carbon foam configured as a structural reinforcement for an aerogel insulator. In general, the thermal conductivity of unfilled carbon foam increases rapidly with temperature, as radiation through the porous structure becomes the dominant mode of heat transfer. Thus, an aerogel insulator may be applied to occupy the pores of the carbon foam, reducing heat transfer. Moreover, a silicon carbide coating, such as a coating applied to the carbon foam via a polymeric precursor, may partially or fully serve as a ligament coating to the carbon foam. Such a configuration may increase the compressive strength of the carbon foam by up to about 250%, while reducing the thermal conductivity by about 5%.

In yet another embodiment, insulation layer 106 comprises a felt of carbon fibers infiltrated by a nanoporous sol-gel derived carbon aerogel. In this configuration, cracks caused by the shrinkage of the gel upon drying may be present in the composite material. These cracks may be up to about 0.5 mm in size. Due to the anisotropic nature of the felt (e.g., the felt may comprise a pinned stack of fiber mats), the thermal conductivity of the composite structure is anisotropic. The anisotropy of the thermal conductivity (i.e., the ratio of the components perpendicular to and parallel to the felt surface) may be about two (2) under vacuum conditions. The density of the carbon fiber felt may be about 100 kilograms per cubic meter, and the density of the felt-aerogel composite may be about 230 kilograms per cubic meter.

In further embodiments, insulation layer 106 may comprise a polysialate syntactic foam. Such embodiments may also include a conductive layer comprising molded exfoliated graphite particulate using a polysialate binder and having a hot side skin comprising an aluminosilicate CMC.

With continued reference to FIG. 2, and in accordance with an exemplary embodiment, cool side skin 108 comprises any suitable structure configured to provide a high strength structural layer to shield section 110. In various embodiments, cool side skin 108 is coupled to insulation layer 106. Cool side skin 108 may comprise a metal, a composite, a ceramic, and/or the like. In an exemplary embodiment, cool side skin 108 comprises silicon carbide reinforced with a carbon fiber. The silicon carbide offers superior oxidation resistance when compared with a typical carbon matrix. Further, a final processing step utilizing silicon resin infiltration may be employed in order to create a strong, dense outer surface layer.

For example, cool side skin 108 may comprise a polysialate matrix reinforced with silica or borosilicate fiber textile, a polysilazane matrix reinforced with silica fiber textile or borosilicate glass, and/or a carbon matrix reinforced with carbon fiber textile. In various embodiments, a cool side skin comprising polysialate matrix reinforced with silica or borosilicate fiber textile may be used in conjunction with an insulation layer comprising polysialate syntactic foam, a conductive layer comprising molded exfoliated graphite particulate using a polysialate binder and a hot side skin comprising an aluminosilicate CMC. In various embodiments, a cool side skin comprising polysilazane matrix reinforced with silica fiber textile may be used in conjunction with an insulation layer comprising carbon felt or foam/aerogel in conjunction with a conductive layer comprising a molded exfoliated graphite particulate using a polysilazane binder and a hot side skin comprising a SiC CMC. In further embodiments, a cool side skin comprising carbon matrix reinforced with carbon fiber textile may be used in conjunction with an insulation layer comprising carbon felt or foam/aerogel, a conductive layer comprising exfoliated graphite particulate with pitch carbon binder and a hot side skin of carbon matrix reinforced with carbon fiber textile.

In various embodiments, cool side skin 108 may optionally comprise a coating. For example, cool side skin 108 may be coated with polysialate or polycarbosilate, preferably in embodiments comprising a hot side skin of carbon matrix reinforced with carbon fiber textile.

Figure 3:
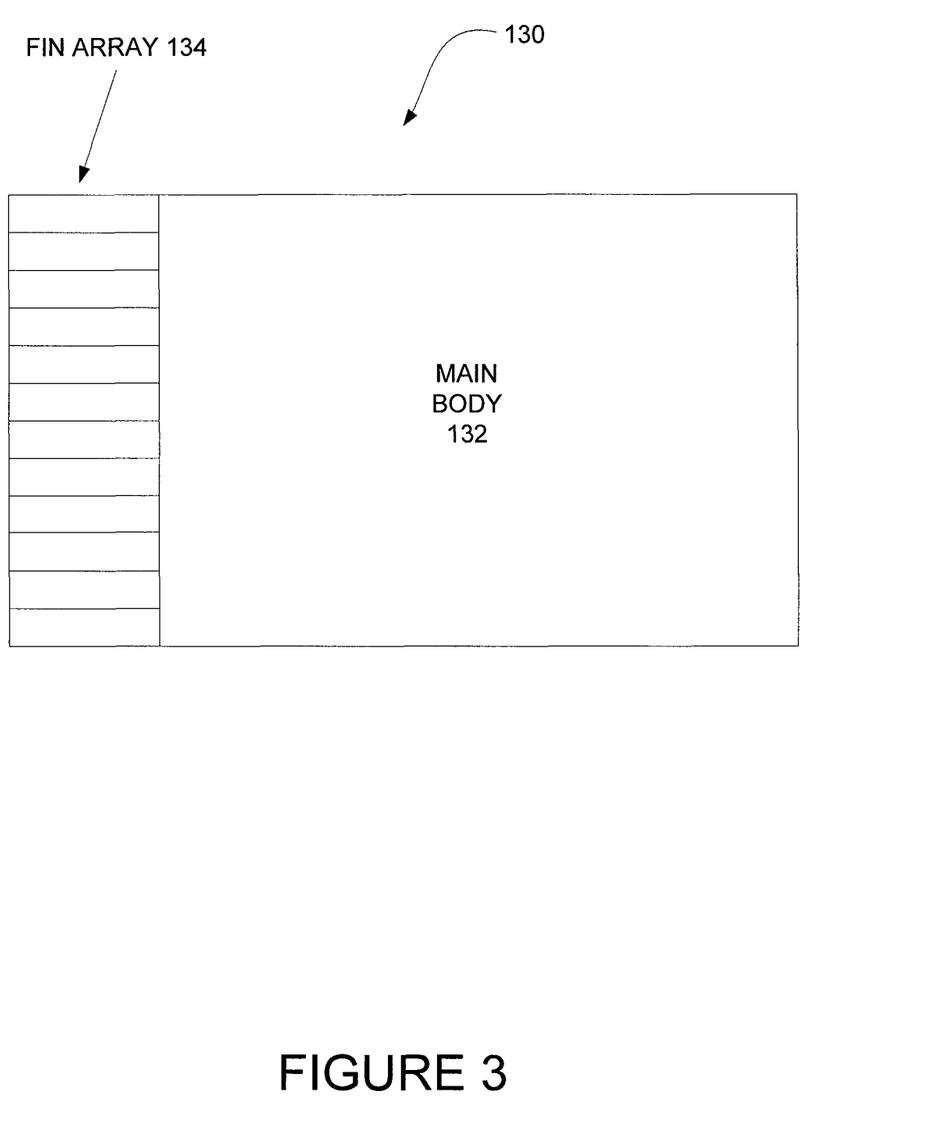
FIG. 3 illustrates a dissipation section of a thermal management system in accordance with an embodiment.

With reference now to FIG. 3, dissipation section 130 may comprise any suitable structure configured to fully or partially transfer heat from thermal management system 100 into the ambient environment. For example, dissipation section 130 may receive thermal energy from conduction layer 104 of shield section 110. Dissipation section 130 may also receive thermal energy from other portions of shield section 110 and/or from an external heat source (e.g., a brake assembly). In accordance with an embodiment, dissipation section 130 comprises a composite material structured as optional main body 132 and fin array 134.

Main body 132 may comprise any suitable structure configured to allow heat transfer from shield section 110 to fin array 134. Moreover, main body 132 may be at least partially or fully integrated into fin array 134 and, in various embodiments, no main body is present. Main body 132 and/or fin array 134 may individually or collectively be referred to as a heat dissipation apparatus.

Fin array 134 may comprise any suitable structure configured to allow partial or full heat transfer from thermal management system 100 into the ambient environment. In various exemplary embodiments, fin array 134 comprises a carbon-based composite material formed by slitting a composite fabric and weaving the fabric strips into an interlaced, "basket weave" pattern. However, the fabric may be interlaced in various alternative arrangements in order to achieve various desired characteristics, such as air flow, structural strength, heat dissipation capability, and the like. In accordance with an embodiment, fin array 134 comprises a series of carbon fins extending outward from main body 132.

Fin array 134 may be formed by creating openings on an exposed end of dissipation section 130. In this manner, the circulation of air or other cooling material may be allowed in and/or around the highly conductive fibers. Such openings may be formed in any suitable manner, for example, during the fiber weaving process, or by a separate piercing operation. Various characteristics of fin array 134 (e.g., fin spacing, fin height, fin length, temperature differential between fin and ambient environment, and the like) may be varied in order achieve a desired degree of heat transfer from dissipation section 130 to the ambient environment.

Additionally, in various embodiments, fin array 134 is placed in a stagnant fluid (e.g., calm air or similar). The density gradient created by the presence of the hot fin surface gives rise to buoyancy driven flow along each fin. In such embodiments, this self-induced flow may be the principal means by which fin array 134 transfers heat to the ambient environment. Fin array 134 may also desirably be exposed to an airstream in order to move a larger amount of air or other cooling fluid over fin array 134. Moreover, fin array 134 may fully or partially transfer heat to the ambient environment in any suitable manner.

A thermal management system 100 may be created via various methods. For example, thermal management system 100 may be welded, bonded, cut, machined, molded, pressed, sintered, cured, heated, annealed, dried, infiltrated, and/or otherwise shaped and/or formed.

Figure 4:
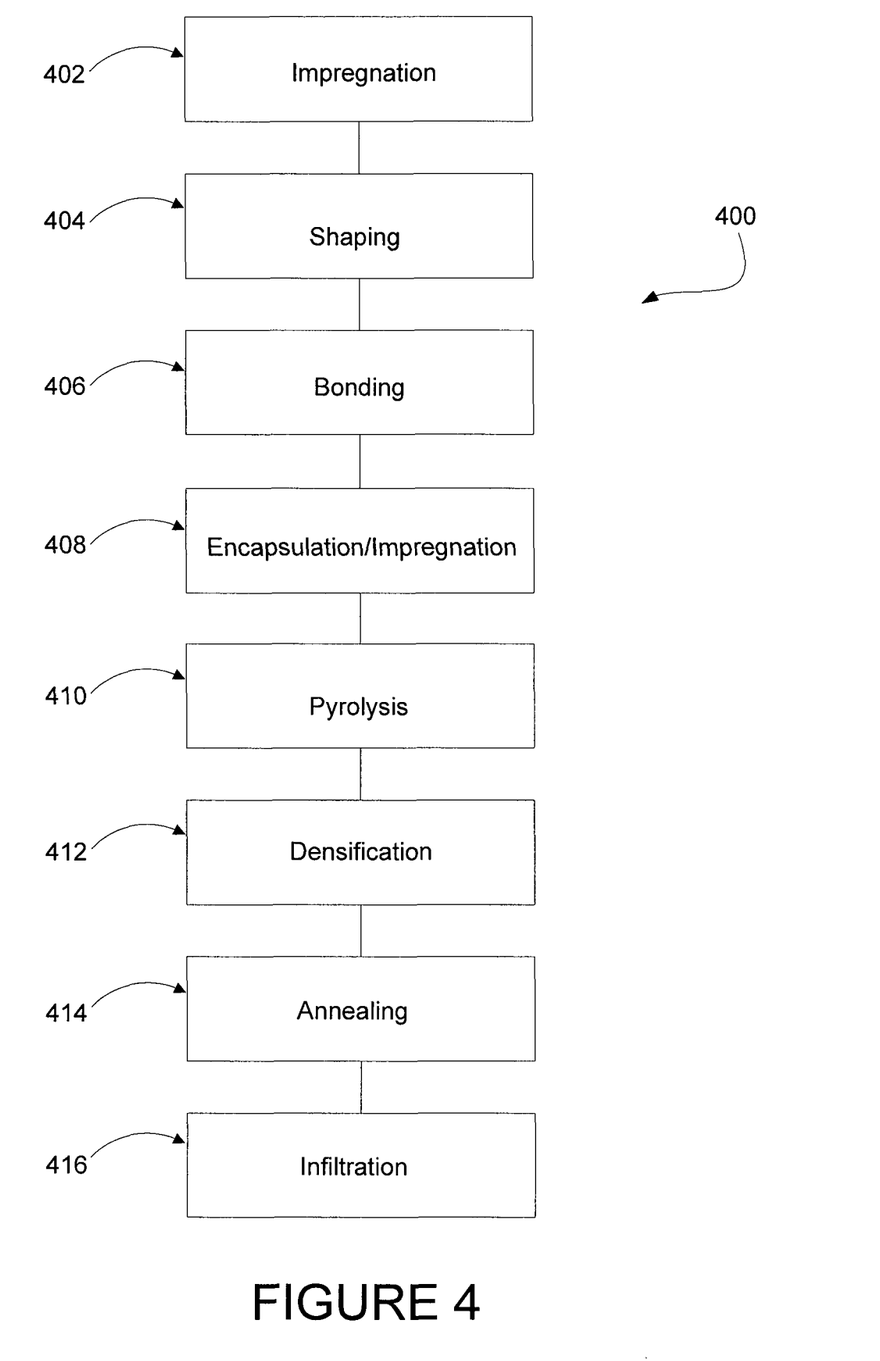
FIG. 4 illustrates a method for creating a thermal management system in accordance with an embodiment.

In an exemplary embodiment, and with reference now to FIG. 4, a woven sheet of low modulus pitch carbon fibers is impregnated with an appropriate resin [step 402]. The carbon sheet is pierced, slit, woven and/or otherwise formed and/or shaped to form fins and openings [step 404]. One or more fin sheets are placed in parallel and cured at a temperature of about 225 degrees Celsius to about 325 degrees Celsius to bond the fin sheets together [step 406]. For example, the fin sheets may be warm pressed using a 10 ton press to produce a partially cured part.

An organic aerogel precursor composition is infiltrated into a reticulated vitreous carbon precursor felt or foam. The infiltrated organic aerogel precursor composition is cured and dried. A conducting particulate is infiltrated, and the aerogel is encapsulated within a woven cloth and impregnated with CMC polymer [step 408].

The assembly is pyrolyzed by heating the cured structure in an inert atmosphere or vacuum to a temperature from about 900 degrees Celsius to about 1350 degrees Celsius for a time from about 30 minutes to about 5 hours [step 410].

The pyrolyzed assembly is densificated to achieve an overall bulk density from about 1.7 grams per cubic centimeter ($g/cm^3$) to about 2.2 $g/cm^3$ at a temperature from about 900 degrees Celsius to about 1100 degrees Celsius [step 412]. The assembly is then annealed at a temperature from about 1800 degrees Celsius to about 3000 degrees Celsius to increase desirable physical properties of the structure [step 414]. For example, annealing may further order the structure of the matrix carbon and the fiber carbon to increase the in-plane and/or through-plane components of thermal conductivity by an order of magnitude or more. Annealing may also improve the oxidative stability of the structure.

The assembly may be infiltrated with coating materials configured to reduce porosity and/or improve rigidity [step 416]. Molten silicon may be infiltrated into the open pores of the sintered body at a temperature of about 1300 degrees Celsius to about 1800 degrees Celsius in a vacuum or an inert atmosphere.

Polymeric pre-ceramic precursors may also be provided and fired. For example, these precursors may yield an amorphous or crystalline beta silicon carbide when fired to a low or high temperature, respectively. Exemplary precursors include Starfire® 1, an allylhydridopolycarbosilane (AHPCS), and VL202, a polysilazane. The precursors may also be modified with the addition of other compounds, for example butoxide in an amount of from about 1% to about 3%. The precursors may be infiltrated by dilution with a solvent. The precursors may also be infiltrated by vacuum infiltration within a mold. The structure is then cured at a low temperature to release the volatile organic compounds, followed by repeated infiltrations before firing at an elevated temperature.

In an embodiment, thermal management system 100 is configured as an aircraft wheel heat shield in order to reduce the flow of heat from the brakes to the wheel. In another embodiment, thermal management system 100 is configured as a heat shield within a brake assembly in order to reduce heat flow from brake friction components to other parts of the brake assembly. Moreover, thermal management system 100 may be configured for use with electronic components, aircraft chassis components, brake pads, brake rotors, gas turbines, household appliances, automotive components, and the like. Thermal management system 100 may be employed in any suitable configuration, application, or industry wherein heat may be partially or fully transmitted from a first location to a second location, and/or partially or fully generated at a first location and insulated from a second location.

In an exemplary embodiment, thermal management system 100 is configured as a generally planar structure having a thickness of between about one-eighth (⅛) inch to about one-fourth (¼) inch, having a through-plane thermal conductivity less than about 2 watts per meter-Kelvin (w/mK), and having an in-plane thermal conductivity greater than about 100 w/mK.

In another embodiment, thermal management system 100 is configured for use with gas turbine fuel nozzles. In this embodiment, thermal management system 100 allows for heat transfer from the nozzles to the ambient environment. In this manner, various operational drawbacks, such as buildup of coke on the fuel nozzles, may be reduced and/or eliminated.

In a further embodiment, thermal management system 100 is configured for use with an aircraft brake. In this embodiment, thermal management system 100 allows for heat transfer from the aircraft brake to the ambient environment. In this manner, the operating temperature of an aircraft brake may be reduced.

In yet another embodiment, the thermal management system is configured for use as a heat sink for an integrated circuit. In this embodiment, the thermal management system is coupled to an integrated circuit, for example a general purpose microprocessor (e.g., Intel Pentium®, AMD Athlon®, and the like). Heat generated by the integrated circuit is partially or fully transmitted through thermal management system 100 and radiated to the ambient environment. Because the thermal conductivity of thermal management system 100 may exceed that of traditional materials (e.g., steel, copper, aluminum, and the like) by an order of magnitude or more, the size and/or expense of integrated circuit cooling systems may be greatly reduced.

Figure 5:
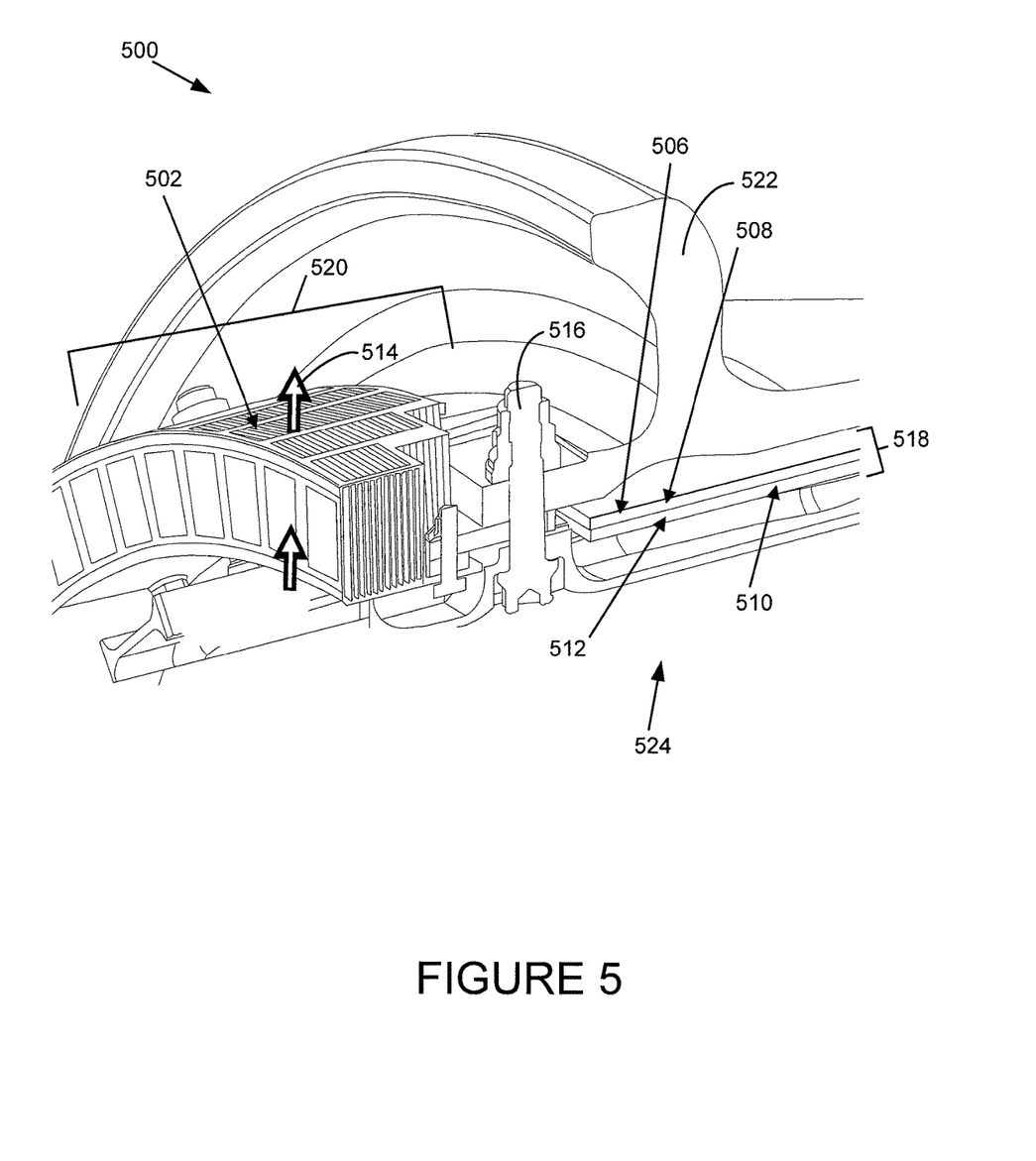
FIG. 5 illustrates a thermal management system configured in an aircraft wheel well in cross section.

With reference to FIG. 5, an exemplary thermal management system 500 is illustrated in cross section in an aircraft wheel well. Thermal management system 500 comprises dissipation section 520 (also referred to as heat dissipation apparatus) and shield section 518. Shield section 518 may comprise hot side skin 512, conductive layer 510, insulation layer 508, and cool side skin 506. In such a configuration, hot side skin 512 is positioned to transfer heat 524 from inside wheel well 522 to conductive layer 510. Conductive layer 510, having in-plane thermal conductivity properties consistent with those described above, is positioned to conduct heat to dissipation section 520. Insulation layer 508 is positioned to assist in the prevention of heat migration (for example, the migration of heat 524) to wheel well 522. Cool side skin 506 is positioned as an interface to wheel well 522. In such a configuration, thermal management system 500 provides wheel well 522 a degree of protection from excess heat, such as heat 524.

Dissipation section 520 comprises a fin array 502 and main body (not shown, but integrated into fin array 502). The main body is thermally coupled to shield section 518, for example, by thermal coupling with conductive layer 510. Thermal coupling may be accomplished via any suitable means, for example, by contacting a portion of conductive layer 510 with a portion of the main body or, in various embodiments, with fin array 502 directly. In various embodiments, thermal coupling may occur, at least partially, through other objects. For example, in various embodiments, bolt 516 may act to transfer thermal energy to the main body and/or fin array 502, although in various embodiments bolt 516 preferably does not act to thermally couple shield section 518 with fin array 502 and/or the main body.

Fin array 502 is configured to allow air to flow through the fin array as shown by direction 514. Air flowing in direction 514 may act to remove heat from fin array 502 and effect heat transfer from fin array 502 to the ambient environment. Thus, thermal energy from inside the wheel well may travel through hot skin 512 to conductive layer 510, through conductive layer 510 to the main body and/or fin array 502, and be released into the ambient environment.

Figure 6:
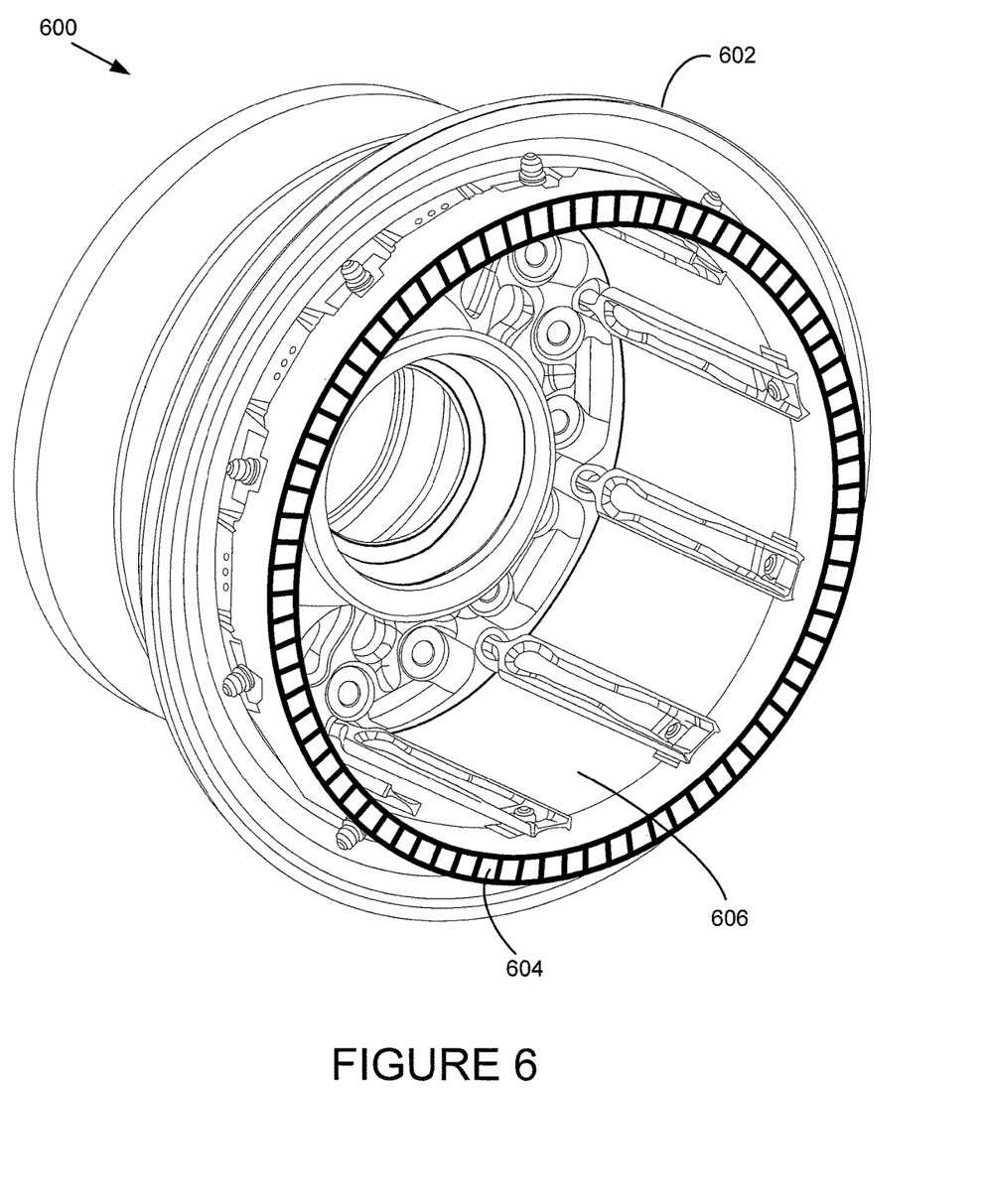
FIG. 6 illustrates a thermal management system configured in an aircraft wheel well.

With reference to FIG. 6, thermal management system 600 is shown disposed in wheel well 602. Shield section 606 is illustrated within the lining of the wheel well, having the hot side skin facing the interior of wheel well 602, above a conductive layer, insulation layer, and cool side skin layer (not shown). Fin array 604 is configured to thermally couple to shield section 606, so that heat may be conducted through fin array 604 and transferred to the ambient environment.

Figure 7:
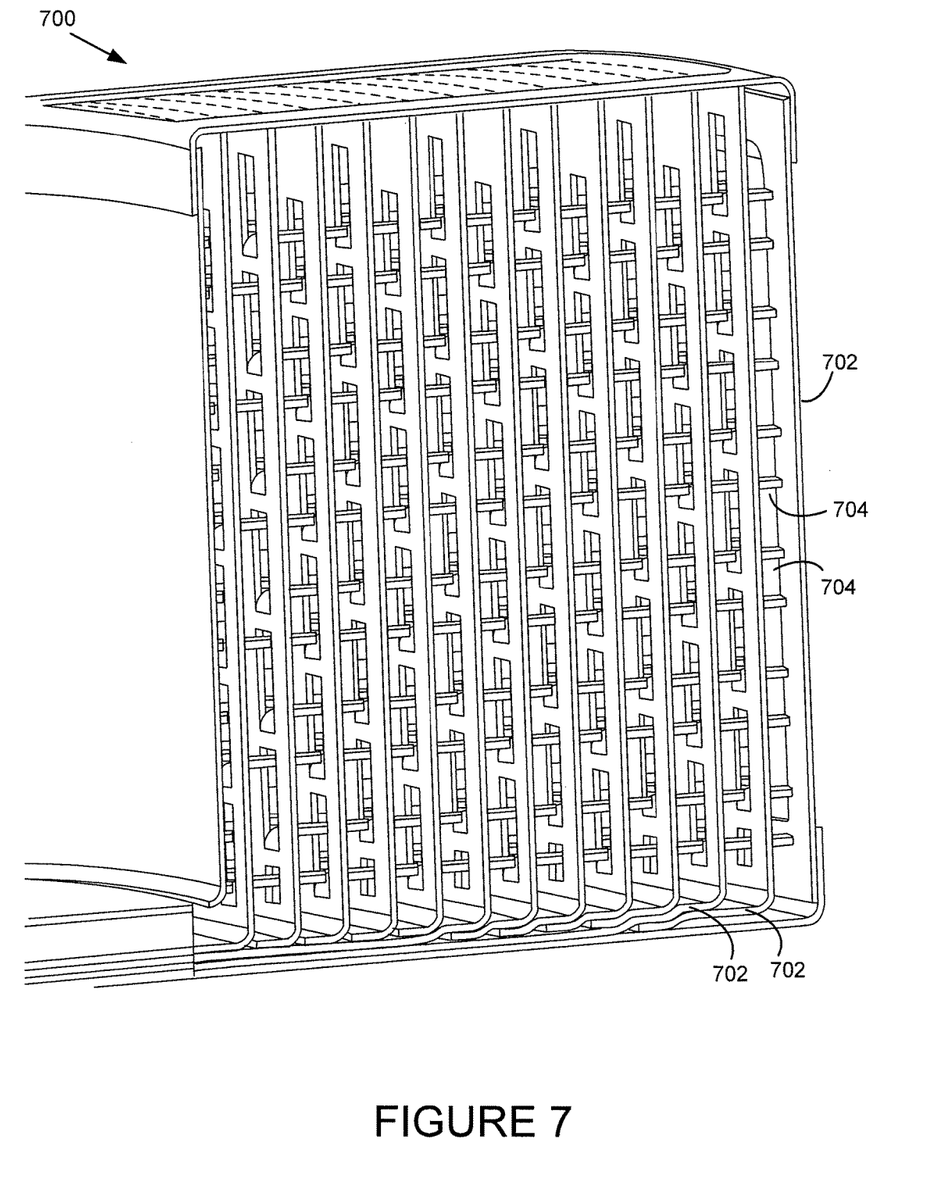
FIG. 7 illustrates a dissipation section.

With reference to FIG. 7, fin array 700 is shown. Fin array 700 has lateral fins 704 and longitudinal fins 702. Although lateral fins 704 and longitudinal fins 702 are shown at substantially right angles to one another, other geometric configurations are contemplated herein. The configuration of lateral fins 704 and longitudinal fins 702 provide extended surface area for the transfer of heat from the fin array to the ambient environment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft wheel heat shield, comprising:
a cylindrical first structure positioned to receive, in a radial direction, heat generated by a heat source comprising an aircraft brake, the cylindrical first structure disposed coaxial to an aircraft wheel, wherein the first structure is in the form of a cylinder; and
a cylindrical second structure disposed coaxially to the first structure and at least partially radially overlapping the cylindrical first structure, thermally coupled to the cylindrical first structure, for conducting the heat in an axial direction to a third structure, wherein the cylindrical second structure is in the form of a cylinder,
wherein the third structure comprises a heat dissipation apparatus,
wherein the cylindrical second structure comprises a carbon fiber structure configured with a thermal conductivity in the axial direction greater than about 100 watts per meter-Kelvin,
where the heat dissipation apparatus comprises an array of fins, the array of fins configured such that longitudinal fins overlap each other on an inner radial side and such that a plurality of radially aligned airflow openings are formed on an outer radial side of each fin in the array of fins, wherein radially aligned airflow openings are prevented from being formed on the inner radial side of each fin.

2. The aircraft wheel heat shield of claim 1, wherein the cylindrical first structure comprises at least one of an aluminosilicate CMC, a SiC CMC, and a carbon composite.

3. The aircraft wheel heat shield of claim 1, wherein the cylindrical first structure is disposed coaxially to an aircraft wheel.

4. The aircraft wheel heat shield of claim 1, further comprising an insulation structure thermally coupled to the cylindrical second structure.

* * * * *